United States Patent
Wuerdinger

(10) Patent No.: US 11,353,061 B1
(45) Date of Patent: Jun. 7, 2022

(54) PRELOADED SHAFT ASSEMBLY

(71) Applicant: Schaeffler Technologies AG & Co. KG, Herzogenaurach (DE)

(72) Inventor: Daniel Wuerdinger, Troy, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/120,704

(22) Filed: Dec. 14, 2020

(51) Int. Cl.
  *F16C 33/58* (2006.01)
  *F16C 3/02* (2006.01)

(52) U.S. Cl.
  CPC .............. *F16C 33/581* (2013.01); *F16C 3/02* (2013.01); *F16C 2229/00* (2013.01); *F16C 2300/22* (2013.01); *F16C 2380/26* (2013.01)

(58) Field of Classification Search
  CPC ...... F16C 33/581; F16C 3/02; F16C 2300/22; F16C 2380/26; F16C 2229/00
  See application file for complete search history.

(56) References Cited

U.S. PATENT DOCUMENTS

| | | | | |
|---|---|---|---|---|
| 3,604,545 A | * | 9/1971 | Bourgeois | F16C 27/066 192/98 |
| 3,741,361 A | * | 6/1973 | Brandenstein | F16C 33/7886 192/110 B |
| 4,212,098 A | * | 7/1980 | Sand | F16C 35/077 29/271 |
| 4,606,655 A | * | 8/1986 | Hofmann | B62K 19/34 384/458 |
| 4,913,564 A | * | 4/1990 | Stephan | F16C 19/16 384/511 |
| 5,433,305 A | * | 7/1995 | Takamatsu | F16D 41/067 192/45.006 |
| 6,179,473 B1 | * | 1/2001 | Ponson | B62D 1/16 384/517 |
| 9,509,191 B2 | * | 11/2016 | Yamaguchi | F16C 35/04 |
| 2007/0211978 A1 | | 9/2007 | Engesser et al. | |
| 2016/0363168 A1 | | 12/2016 | Serafini et al. | |

FOREIGN PATENT DOCUMENTS

| | | |
|---|---|---|
| JP | 10-220469 A | 8/1998 |
| JP | 4442610 B2 | 3/2010 |
| JP | 2017-190825 A | 10/2017 |

* cited by examiner

*Primary Examiner* — Rick K Chang
(74) *Attorney, Agent, or Firm* — Volpe Koenig

(57) ABSTRACT

A shaft assembly is disclosed herein. The assembly includes a shaft, an outer housing, a bearing assembly, and a preload spring. The bearing assembly includes an inner ring mounted on the shaft and defining an inner raceway. An outer ring defines an outer raceway and an annular groove, and the outer ring is arranged within the outer housing. A plurality of rolling elements are arranged between the inner raceway and the outer raceway. The preload spring includes: a washer body positioned within the annular groove of the outer ring, and a flange extending axially from the washer body and contacting the outer housing.

19 Claims, 3 Drawing Sheets

PRELOADED SHAFT ASSEMBLY

FIELD OF INVENTION

The present disclosure relates to a shaft assembly, and more particularly is related to a preloaded arrangement for a shaft assembly.

BACKGROUND

Electric motors, particularly in high speed input shaft arrangements, sometimes require a "semi-floating" bearing configuration in which two bearing assemblies share the axial load in different drive directions. A first bearing assembly is typically loaded in the drive mode, and a second bearing assembly is typically loaded in a regenerative mode. Shifts in the axial loads can result in sudden movement of the shaft, which causes unwanted noise, vibration, and harshness (NVH).

Shimming or preloading can be employed to help address the NVH issues. However, installing these components requires an additional assembly step, which is undesirable and time-consuming. Additionally, arranging a preload spring, such as a wave spring, or a shim relative to the shaft assembly can require additional measurement steps to determine a requisite stack-up length.

Therefore, there is a general desire to provide a simplified configuration for addressing the varying axial loads experienced by a shaft assembly.

SUMMARY

A shaft assembly that solves these preload issues, among other issues, is disclosed herein. The shaft assembly generally includes: a shaft; an outer housing; a bearing assembly; and a preload spring. The preload spring includes a washer body positioned or arranged within an annular groove of an outer ring of the bearing assembly, and a flange extending axially from the washer body and contacting the outer housing.

In one aspect, the flange has a curved profile, and includes a medial portion that contacts the outer housing and a terminal portion that contacts an outer bearing ring of the bearing assembly. The terminal portion of the flange is positioned radially outward from the washer body in one aspect.

The flange can have a varying thickness. In one aspect, a terminal portion of the flange has a smaller thickness than a medial portion of the flange. The terminal portion of the flange can be positioned radially inward from a radially outer surface of the outer bearing ring in an installed state.

An outer diameter of the washer body is greater than an outer diameter of the annular groove of the outer ring, such that the washer body is compressed to be clipped into position within the annular groove and the washer body is retained with the outer ring.

The preload spring is formed from steel in one embodiment. The flange extends axially beyond an axial end face of the shaft in one aspect.

Characteristics of the preload spring can vary. For example, the flange can have a circumferential curvature (R) of 90 degrees to 220 degrees in an uncompressed state.

The washer body and the flange are formed integrally with each other such that the preload spring is a unitary component, which simplifies installation.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
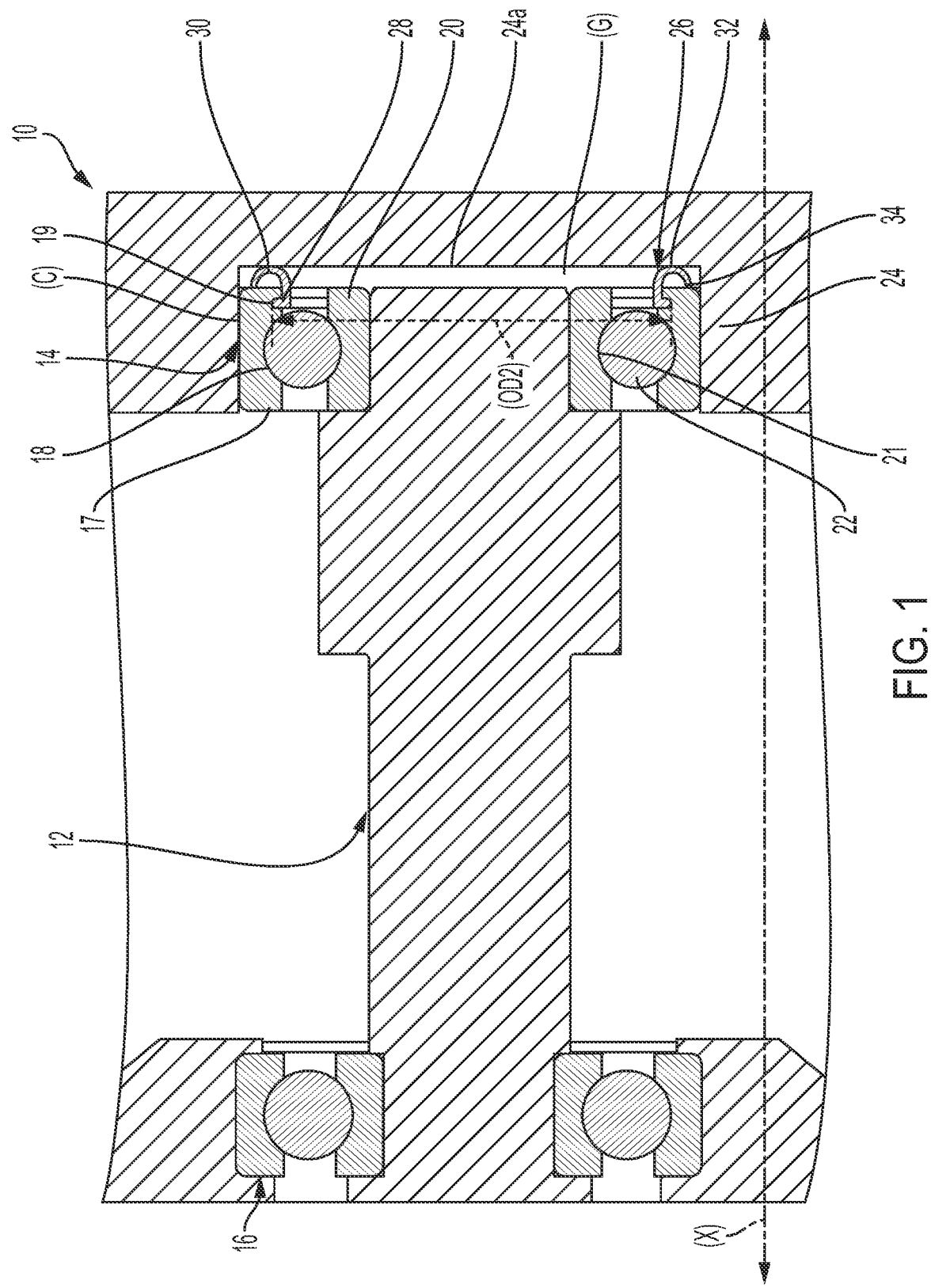
FIG. 1 is a cross-sectional view of a shaft assembly according to one aspect.
Figure 2:
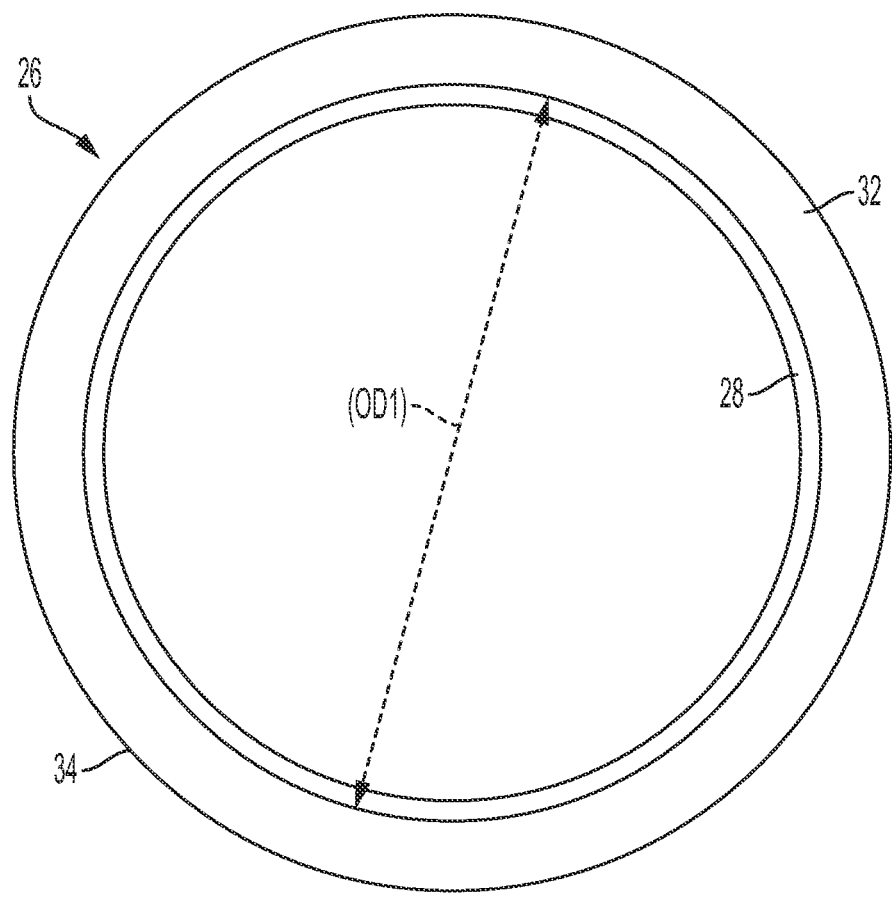
FIG. 2 is a planar view of a preload spring as viewed from the left-hand side of the assembly in FIG. 1.

Certain terminology is used in the following description for convenience only and is not limiting. "Axially" refers to a direction along an axis (X) of an assembly, as shown in FIG. 1. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIG. 1, a shaft assembly 10 is disclosed. The shaft assembly 10 includes a shaft 12, an outer housing 24, at least one bearing assembly 14, and a preload spring 26. As shown in FIG. 1, two bearing assemblies 14, 16 are provided, each arranged on opposite axial ends of the shaft 10. One of ordinary skill in the art would understand that the second bearing assembly 16 can be omitted, or additional bearing assemblies can be provided in various embodiments.

In one embodiment, the shaft 12 is formed as a helical shaft. One of ordinary skill in the art would understand that the configuration of the shaft 12 can vary.

The bearing assembly 14 includes an inner ring 20 mounted on the shaft 12 and defining an inner raceway 21. An outer ring 17 defines an outer raceway 18 and an annular groove 19, and the outer ring 17 is arranged within the outer housing 24. A plurality of rolling elements 22 are arranged between the inner raceway 21 and the outer raceway 18. The rolling elements 22 are shown as circular rolling elements in FIG. 1, but one of ordinary skill in the art would understand that rollers or tapered rolling elements can be used.

Although the groove 19 is shown as being formed on an axially outer end of the outer ring 17, one of ordinary skill in the art would understand that the location of the groove 19 can vary, and could be defined anywhere on the outer ring 17 or can be formed on the inner ring 20. Additionally, one of ordinary skill in the art would understand that the annular groove 19 can be machined for another component, such as a shield or seal component. As disclosed herein, this annular groove 19 can be essentially repurposed or utilized to address a different issue (i.e. preloading a floating bearing arrangement) compared to the issues addressed by shields or seals (i.e. preventing debris egress).

In one aspect, the inner ring 20 is press fit onto the shaft 12 and radial clearance (C) is defined between a radially outer surface of the outer ring 17 and a radially inner surface of the outer housing 24. One of ordinary skill in the art would understand that this configuration can vary.

As shown in FIG. 1, an axial gap (G) is defined between an axial end face of the bearing assembly 14 and an axial end face 24a of housing 24. The gap (G) can vary depending on the specific mounting configuration of a shaft assembly 10. The size of the gap (G) dictates the stiffness and characteristics of the preload spring 26, as disclosed in more detail herein.

The preload spring 26 includes a washer body 28 positioned within the annular groove 19 of the outer ring 17, and a flange 30 extends axially from the washer body 28 and contacts the outer housing 24.

The preload spring 26 is compressed to fit within the annular groove 19 of the outer ring 17. An outer diameter (OD1) of the washer body 28 in an uninstalled state is greater than an outer diameter (OD2) of the annular groove 19 of the outer ring 17, such that the washer body 28 is clipped or pressed into position within the annular groove 19 during installation. In other words, the preload spring 26 is press-fit or radially squeezed to be installed into the annular groove 19 and retained therein.

Both the washer body 28 and the flange 30 are formed as annular components in one aspect. One of ordinary skill in the art would understand that in other configurations, a predetermined number of separately formed flanges 30 could be formed integrally with the annular washer body 28.

The washer body 28 and the flange 30 are formed integrally with each other such that the preload spring 26 is a unitary component, in one aspect. This results in a relatively uncomplicated configuration in which installation only requires squeezing the washer body 28 enough for the preload spring 26 to snap into the annular groove 19.

The preload spring 26 is formed from steel, in one aspect. One of ordinary skill in the art would understand that material forming the preload spring 26 can vary. For example, the preload spring 26 can be formed by a polymer or rubber that is configured to clip within the annular groove 19.

Contact between the flange 30 and the outer housing 24 provides preloading and addresses NVH issues caused by play between the bearing assembly 14 and the outer housing 24. The flange 30 is configured to directly contact the outer housing 24, and specifically does not require any additional components, such as shims.

In one aspect, the flange 30 has a curved profile and includes a medial portion 32 that contacts the outer housing 24 and a terminal portion 34 that contacts outer ring 17. The flange 30 extends axially beyond an axial end face of the shaft 12 in one embodiment.

As shown in FIG. 1, the terminal portion 34 of the flange 30 is positioned radially outward from the washer body 28. One of ordinary skill in the art would understand that the terminal portion 34 of the flange 30 may extend radially inward relative to the washer body 28 in another aspect.

In one aspect, the terminal portion 34 of the flange 30 is positioned radially inward relative to a radially outer surface of the outer ring 17 in an installed state.

Figure 3:
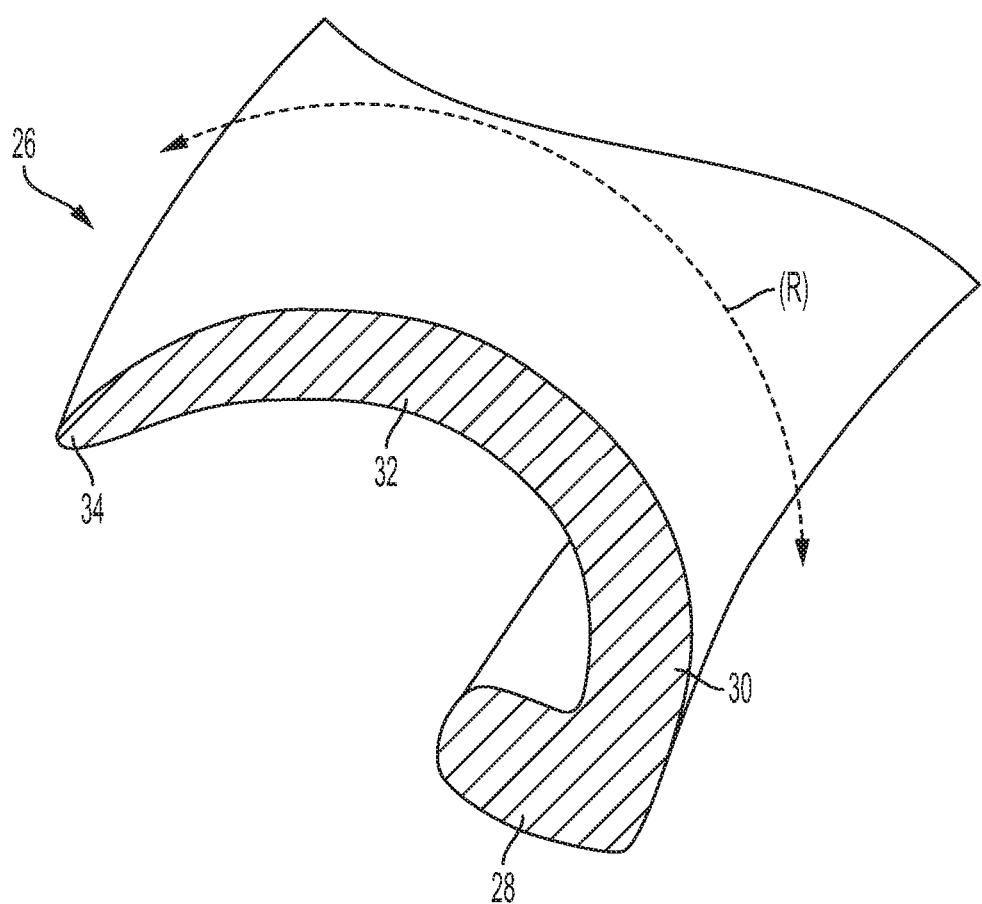
FIG. 3 is a cross-sectional perspective view of the preload spring of FIGS. 1 and 2.

In one aspect, the flange 30 has a varying thickness, as clearly shown in FIG. 3. For example, the terminal portion 34 of the flange 30 may have a smaller thickness than a medial portion 32 of the flange 30.

As shown in FIG. 3, the flange 30 has a circumferential curvature (R) of 90 degrees to 220 degrees in an uncompressed state. The circumferential curvature (R) can vary depending on the specific requirements of a particular application. One of ordinary skill in the art would also understand that the preload spring 26 has differing profiles depending on its state, i.e. whether the preload spring 26 is installed in the annular groove 19 (as shown in FIG. 1) or pre-installation (as shown in FIG. 3).

Modifying various characteristics of the preload spring 26 will affect the preload effect of this arrangement. For example, a thickness of the flange 30, a length or extent of the flange 30, and a curvature of the preload spring 26 can all be varied to provide various stiffness coefficients of the preload spring 26 and therefore varying preload effects.

A method of preloading a bearing assembly 14 relative to a shaft 12 and a housing 24 is also disclosed herein. The method includes mounting a preload spring 26 inside of an outer ring 17 by positioning a washer body 28 of the preload spring 26 within an annular groove 19 of the outer ring 17. This configuration ensures that the preload spring 26 is fixed relative to the outer ring 17. The preload spring 26 also includes an axially extending flange 30 that extends axially outward from the outer ring 17. The flange 30 directly contacts with the outer housing 24, and more specifically directly contacts an axial end face 24a of the housing 24. This contact provides the preload and solves issues related to NVH. The method can include further steps and components, but specifically does not require the use of shims or other components. This process specifically improves installation by not requiring users or other personnel to measure the size of a gap between the bearing assembly 14 and the housing 24, and then add a certain number of stacking components or shims to address the specific size of the gap.

Having thus described the present disclosure in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Shaft assembly 10
Shaft 12
First bearing assembly 14
Second bearing assembly 16
Outer ring 17
Outer raceway 18
Groove 19 in outer ring
Inner ring 20
Inner raceway 21
Rolling elements 22
Housing 24
End face 24a of housing
Preload spring 26
Washer body 28

Flange 30
Medial portion 32 of spring flange
Terminal portion 34 of spring flange

What is claimed is:

1. A bearing ring-preload spring assembly comprising:
    at least one bearing ring including a raceway configured to support rolling elements, and an annular groove; and
    a preload spring including a washer body dimensioned to be received within the annular groove, and a flange extending axially from the washer body and configured to contact an outer housing, wherein the washer body and the flange are formed integrally with each other such that the preload spring is a unitary component.

2. The bearing ring-preload spring assembly of claim 1, wherein the flange has a curved profile and includes a medial portion that is configured to directly contacts an outer housing and a terminal portion that directly contacts the outer at least one bearing ring.

3. The bearing ring-preload spring assembly of claim 2, wherein the terminal portion of the flange is positioned radially outward from the washer body.

4. The bearing ring-preload spring assembly of claim 1, wherein the flange has a varying thickness.

5. The bearing ring-preload spring assembly of claim 1, wherein a terminal portion of the flange has a smaller thickness than a medial portion of the flange.

6. The bearing ring-preload spring assembly of claim 1, wherein a terminal portion of the flange is positioned radially inward relative to a radially outer surface of the at least one bearing ring in an installed state.

7. The bearing ring-preload spring assembly of claim 1, wherein the preload spring is formed from steel.

8. The bearing ring-preload spring assembly of claim 1, wherein an outer diameter of the washer body is greater than an outer diameter of the annular groove of the at least one bearing ring, such that the washer body is clipped into position within the annular groove to join the at least one bearing ring with the preload spring.

9. The bearing ring-preload spring assembly of claim 1, wherein the flange has a circumferential curvature (R) of 90 degrees to 220 degrees in an uncompressed state.

10. The bearing ring-preload spring assembly of claim 1, wherein the flange has a varying thickness, and a terminal portion of the flange has a smaller thickness than a medial portion of the flange.

11. A bearing ring-preload spring assembly comprising:
    at least one bearing ring including a raceway configured to support rolling elements, and an annular groove; and
    a preload spring including a washer body dimensioned to be received within the annular groove, and a flange extending axially from the washer body and configured to contact an outer housing, wherein the preload spring is formed from steel.

12. The bearing ring-preload spring assembly of claim 11, wherein the washer body and the flange are formed integrally with each other such that the preload spring is a unitary component.

13. The bearing ring-preload spring assembly of claim 11, wherein an outer diameter of the washer body is greater than an outer diameter of the annular groove of the at least one bearing ring, such that the washer body is clipped into position within the annular groove to join the at least one bearing ring with the preload spring.

14. The bearing ring-preload spring assembly of claim 11, wherein the flange has a circumferential curvature (R) of 90 degrees to 220 degrees in an uncompressed state.

15. The bearing ring-preload spring assembly of claim 11, wherein the flange has a varying thickness, and a terminal portion of the flange has a smaller thickness than a medial portion of the flange.

16. A bearing ring-preload spring assembly comprising:
    at least one bearing ring including a raceway configured to support rolling elements, and an annular groove; and
    a preload spring including a washer body dimensioned to be received within the annular groove, and a flange extending axially from the washer body and configured to contact an outer housing, wherein a terminal portion of the flange is positioned radially inward from a radially outer surface of the at least one bearing ring in an installed state.

17. The bearing ring-preload spring assembly of claim 16, wherein the flange has a circumferential curvature (R) of 90 degrees to 220 degrees in an uncompressed state.

18. The bearing ring-preload spring assembly of claim 16, wherein the flange has a varying thickness, and a terminal portion of the flange has a smaller thickness than a medial portion of the flange.

19. The bearing ring-preload spring assembly of claim 16, wherein an outer diameter of the washer body is greater than an outer diameter of the annular groove of the at least one bearing ring, such that the washer body is clipped into position within the annular groove to join the at least one bearing ring with the preload spring.

* * * * *

UNITED STATES PATENT AND TRADEMARK OFFICE
CERTIFICATE OF CORRECTION

PATENT NO. : 11,353,061 B1
APPLICATION NO. : 17/120704
DATED : June 7, 2022
INVENTOR(S) : Daniel Wuerdinger It is certified that error appears in the above-identified patent and that said Letters Patent is hereby corrected as shown below:

In the Claims

In Claim 2, at Column 5, Line 16, delete the word "contacts" and insert the word --contact--, therefor.

In Claim 2, at Column 5, Line 18, delete the first word in that line, "outer", therefor.

Signed and Sealed this
Sixteenth Day of August, 2022

*Katherine Kelly Vidal*

Katherine Kelly Vidal
*Director of the United States Patent and Trademark Office*